(12) United States Patent
Oikawa

(10) Patent No.: US 8,497,032 B2
(45) Date of Patent: Jul. 30, 2013

(54) BAG-LIKE SEPARATOR, ELECTRODE SEPARATOR ASSEMBLY, AND METHOD OF PRODUCING ELECTRODE SEPARATOR ASSEMBLY

(75) Inventor: Kiyokazu Oikawa, Kanagawa (JP)

(73) Assignee: NEC Corporation, Tokyo (JP)

( * ) Notice: Subject to any disclaimer, the term of this patent is extended or adjusted under 35 U.S.C. 154(b) by 509 days.

(21) Appl. No.: 12/524,275

(22) PCT Filed: Jan. 18, 2008

(86) PCT No.: PCT/JP2008/050631
§ 371 (c)(1),
(2), (4) Date: Jul. 23, 2009

(87) PCT Pub. No.: WO2008/090824
PCT Pub. Date: Jul. 31, 2008

(65) Prior Publication Data
US 2010/0099021 A1    Apr. 22, 2010

(30) Foreign Application Priority Data

Jan. 25, 2007    (JP) .................................. 2007-015236

(51) Int. Cl.
*H01M 2/14*        (2006.01)
(52) U.S. Cl.
USPC ........................... 429/129; 429/136; 429/247
(58) Field of Classification Search
USPC ......................................... 429/129, 247, 136
See application file for complete search history.

(56) References Cited

U.S. PATENT DOCUMENTS
4,215,186 A    7/1980    Jaeger

FOREIGN PATENT DOCUMENTS
JP    07-302616    11/1995
JP    09-129211    5/1997

*Primary Examiner* — Jane Rhee
(74) *Attorney, Agent, or Firm* — Dickstein Shapiro LLP

(57) ABSTRACT

Four sides of a rectangular bag-like separator 10 are composed of two adjacent separator thermo-bonding sides 10a and 10c where thermo-bonding portions are formed and of two adjacent insertion opening sides 10b and 10d forming one insertion opening 11 into which an electrode 30 can be inserted. A thermo-bonding section is formed in a portion of at least one of the insertion opening sides 10b and 10d.

15 Claims, 8 Drawing Sheets

BAG-LIKE SEPARATOR, ELECTRODE SEPARATOR ASSEMBLY, AND METHOD OF PRODUCING ELECTRODE SEPARATOR ASSEMBLY

TECHNICAL FIELD

The present invention relates to a bag-like separator, an electrode separator assembly, and a method of producing an electrode separator assembly.

BACKGROUND ART

An electrode stack is constructed by stacking an intended number of strip-like positive electrodes including a positive electrode lead and strip-like negative electrodes including a negative electrode and sandwiching separators made of a strip-like microporous polyethylene film between the positive and negative electrodes, the separators including substantially the same shape and size as the strip-like negative electrodes. To prevent lithium precipitation from edges of the strip-like negative electrodes during repeated charging and discharging, the outer circumference of the positive electrode is sized to be smaller than the outer circumference of the negative electrode. Here, the outer circumference of the positive electrode corresponds to the inner circumference of the negative electrode such that the positive electrode is placed inside the electrode surface of the negative electrode.

However, in the case of stacking the strip-like positive and negative electrodes, a lithium ion battery has a problem in which stacking misalignment between the positive and negative electrodes may occur since the positive electrode is smaller than the negative electrode and a portion serving as a reference for stacking the positive electrode on the negative electrode substantially does not exist.

In the case of the stacking misalignment, edges of the positive and negative electrodes are aligned in part, or the electrode surface of the positive electrode protrudes out of the electrode surface of the negative electrode. In addition, some problems that greatly degrade the reliability of the battery may occur. For example, lithium precipitates from electrode edges due to repeated charging/discharging, cycle characteristics degrade, and short-circuits occur in the battery. Then, additional processes are required to test or correct stacking misalignment, and thus the manufacturing process becomes complicated.

To overcome such problems, Japanese Patent Laid-Open No. 07-302616 discloses a square type lithium ion secondary battery including a bag-like separator and a strip-like positive electrode located inside the separator. This document discloses a type in which the bag-like separator is a strip-like microporous plastic film, with at least one thereto-bonding section formed in each of at least two adjacent sides thereof, and the strip-like positive electrode is located by the thembonding sections. This document also discloses another type in which at least one thermo-bonding section is formed on each of four sides of the bag-like separator, and the strip-like positive electrode is positioned by the thereto-bonding sections.

DISCLOSURE

However, when peripheral portions of the bag-like separator are bonded after the bag-like separator is overlapped with the electrode, it may be difficult to locate the positive electrode inside the bag-like separator.

Specifically, the electrode is required to be positioned with high precision using, for example, a jig from outside the separator when placing the electrode on the separator since the difference in size between the electrode and the separator is required to be as small as possible to enhance space efficiency. In addition, when bonding peripheral portions of the separator using, for example, a heated fitment after three parts (i.e., separator/electrode/separator) are mutually positioned, a considerable level of precision is required for contact points of the heated fitment. If precision is not ensured, a process defect in which a place that overlaps the electrode is thermally pressed will occur.

When a bag-like separator with previously-bonded sections is prepared with means for inserting an electrode, the electrode can be automatically positioned and stored by the bonded sections. As a result, the jig is not required for positioning the electrode, and a process defect in which a place that overlaps the electrode is of thermally pressed is prevented. Considering the bonded sections, when the positive electrode is loaded into the bag-like separator after only two adjacent sides are bonded, the positive electrode may be misaligned inside the bag-like separator in the following process or after a battery is produced. Then, there is a problem that misalignment may occur, particularly, in both the longitudinal and both the transverse directions.

To avoid this problem, the electrode is inserted through one side after the other three sides are bonded. Then, positional misalignment rarely occurs. However, according to the disclosure related to the present invention, the area of an insertion opening is similar to the width of the positive electrode. Thus, the storing process is difficult since the posture of the positive electrode cannot be changed when bonded sections on both sides of the insertion opening are under strong slide resistance or while the electrode is being loaded to a predetermined position after insertion is started. In addition, a concept of previously bonding only two sides of the separator, inserting the electrode into the separator, and then bonding a third side of the separator is also considered. However, it is impossible to prevent the electrode from being misaligned before or during bonding the third side.

Accordingly, the present invention has been made in consideration of the foregoing problems, and an object of the invention is to provide a bag-like separator, an electrode separator assembly, and a method of producing an electrode separator assembly that can facilitate moving an electrode into the bag-like separator and moving and loading the electrode to and at a specific position inside the bag-like separator, and also to prevent the electrode from being misaligned inside the bag-like separator after being loaded.

In order to achieve the above objects, a rectangular bag-like separator produced in the form of a bag by thermo-bonding of peripheral portions of a microporous film, wherein the rectangular bag-like separator defines four separator sides including two adjacent separator thermo-bonding sides including thermo-bonding sections formed therein and two adjacent insertion opening sides defining an insertion opening through which the electrode is allowed to be inserted and including a thermo-bonding section formed in a portion of at least one thereof.

In the bag-like separator of the invention, the insertion opening is formed along the two adjacent sides of the bag-like separator to widen the insertion opening. Thus, the electrode can be easily inserted into the bag-like separator of the invention. In addition, the bag-like separator of the invention has the thermo-bonding section in a portion of the insertion opening sides. This as a result makes it possible to effectively prevent the stored electrode from being misaligned while easily inserting the electrode.

In addition, the bag-like separator of the invention can reduce slide resistance between the thermo-bonding sections and the electrode and change the posture of the electrode inside the bag-like separator while the electrode is being inserted since the insertion opening is wide. Thereby, in the bag-like separator of the invention, the electrode can easily move inside the separator and thus be easily inserted into the final position.

Furthermore, the bag-like separator of the invention can prevent the electrode from being misaligned by using the thermo-bonding sections of the two separator thermo-bonding sides and the thermo-bonding section formed in a portion of the insertion opening sides. The bag-like separator of the invention can prevent misalignment in a transverse direction unless the rotation direction is misaligned. Accordingly, the bag-like separator of the invention can facilitate inserting the electrode as well as prevent the electrode from being misaligned inside the bag-like separator in the procedure of a manufacturing process subsequent to the electrode-inserting process or after the manufacturing process.

In the bag-like separator of the invention, the thermo-bonding section in one of the insertion opening sides is formed in a position where one of the peripheral sides of the thermo-bonding section, an opposing side being oriented toward the separator thermo-bonding side opposite the insertion opening side including the thermo-bonding section, or an extension line extending from the opposing side toward the separator thermo-bonding side adjacent to the insertion opening side including the thermo-bonding section intersects an extension line extending from one of peripheral sides of the thermo-bonding section formed in the separator thermo-bonding side adjacent to the insertion opening side including the thermo-bonding section, the peripheral side being oriented toward the insertion opening side opposite the separator thermo-bonding side.

The electrode separator assembly of the invention may comprise a rectangular bag-like separator produced in the form of a bag by thermo-bonding of peripheral portions of a microporous film, wherein the rectangular bag-like separator defines four separator sides including two adjacent separator thermo-bonding sides including thermo-bonding sections formed therein and two adjacent insertion opening sides defining an insertion opening through which an electrode is allowed to be inserted and including a thermo-bonding section formed in a portion of at least one thereof; and the electrode stored inside the bag-like separator.

In the electrode separator assembly of the invention, the thermo-bonding section in one of the insertion opening sides is formed in a position where an opposing side which is one of the peripheral sides of the thereto-bonding section, the opposing side being oriented toward the separator thermo-bonding side opposite the insertion opening side including the thermo-bonding section, or an extension line extending from the opposing side toward the separator thermo-bonding side adjacent to the insertion opening side including the thermo-bonding section intersects an extension line extending from one of the peripheral sides of the thermo-bonding section formed in the separator thermo-bonding side adjacent to the insertion opening side including the thermo-bonding section, the peripheral side being oriented toward the insertion opening side opposite the separator thermo-bonding side.

The electrode of the electrode separator assembly of the invention may be positioned by the thermo-bonding sections of the separator thermo-bonding sides and the thermo-bonding section formed in a portion of the insertion opening sides.

In addition, the extension provided on the electrode of the electrode separator assembly of the invention may be narrower than the width of the electrode, and may be provided in a position that does not interfere with the thermo-bonding section formed in a portion of the insertion opening sides.

The method of producing an electrode separator assembly of the invention may include a first procedure of forming two separator thereto-bonding sides by forming thermo-bonding sections in two adjacent ones of four separator sides of a rectangular bag-like separator; a second procedure of forming two insertion opening sides and an insertion opening in the two insertion opening sides, the insertion opening allowing an electrode to be inserted through the insertion opening, by forming a thermo-bonding section in a portion of at least one of the two separator sides; and inserting the electrode through the insertion opening into a bag-like separator obtained from the first and second procedures.

The method of producing an electrode separator assembly of the invention may include a procedure of forming the thermo-bonding section formed in one of the insertion opening sides to be placed in a position where one of the peripheral sides of the thermo-bonding section, an opposing side being oriented toward the separator thermo-bonding side opposite the insertion opening side including the thermo-bonding section, or an extension line extending from the opposing side toward the separator thermo-bonding side adjacent to the insertion opening side including the thermo-bonding section intersects an extension line extending from one of peripheral sides of the thermo-bonding section formed in the separator thermo-bonding side adjacent to the insertion opening side including the thermo-bonding section, the peripheral side being oriented toward the insertion opening side opposite the separator thermo-bonding side.

The method of producing an electrode separator assembly of the invention may include a procedure of moving the electrode inside the bag-like separator while guiding the electrode by only the thermo-bonding sections of the separator thermo-bonding side; and a procedure of moving the electrode inside the bag-like separator while guiding the electrode by the thermo-bonding sections of the separator thermo-bonding sides and the thermo-bonding section formed in a portion of the insertion to opening sides.

The method of producing an electrode separator assembly of the invention may include a procedure of positioning the electrode by the thermo-bonding sections of the separator thermo-bonding sides and the thermo-bonding section formed in a portion of the insertion opening sides.

The method of producing an electrode separator assembly of the invention may include a procedure of previously preparing an extension in a position that does not interfere with the thermo-bonding section formed in a portion of the insertion opening sides, the extension including a width narrower than the width of the electrode, and inserting the electrode with the extension into the bag-like separator.

The method of producing an electrode separator assembly of the invention may include a procedure of forming a thermo-bonding section in a position of the insertion opening side that divides the insertion opening after the electrode is inserted into and located inside the bag-like separator.

According to the present invention, the electrode can be easily inserted by the wide insertion opening. Since the thermo-bonding section is formed only in a portion of the insertion opening sides, slide resistance between the thereto-bonding section and the electrode is small. Since the posture of the electrode can be changed inside the bag-like separator, the electrode can easily move inside the separator. Furthermore, since the electrode is positioned by the thermo-bonding sections of the two separator thermo-bonding sides and the thereto-bonding section formed in a portion of the insertion opening sides, it is possible to prevent the electrode from being misaligned inside the bag-like separator in a procedure of a manufacturing process that is subsequent to the electrode-inserting process or after the manufacturing process.

BEST MODE

The present invention will now be described more fully hereinafter with reference to the accompanying drawings.

First Embodiment

Figure 1:
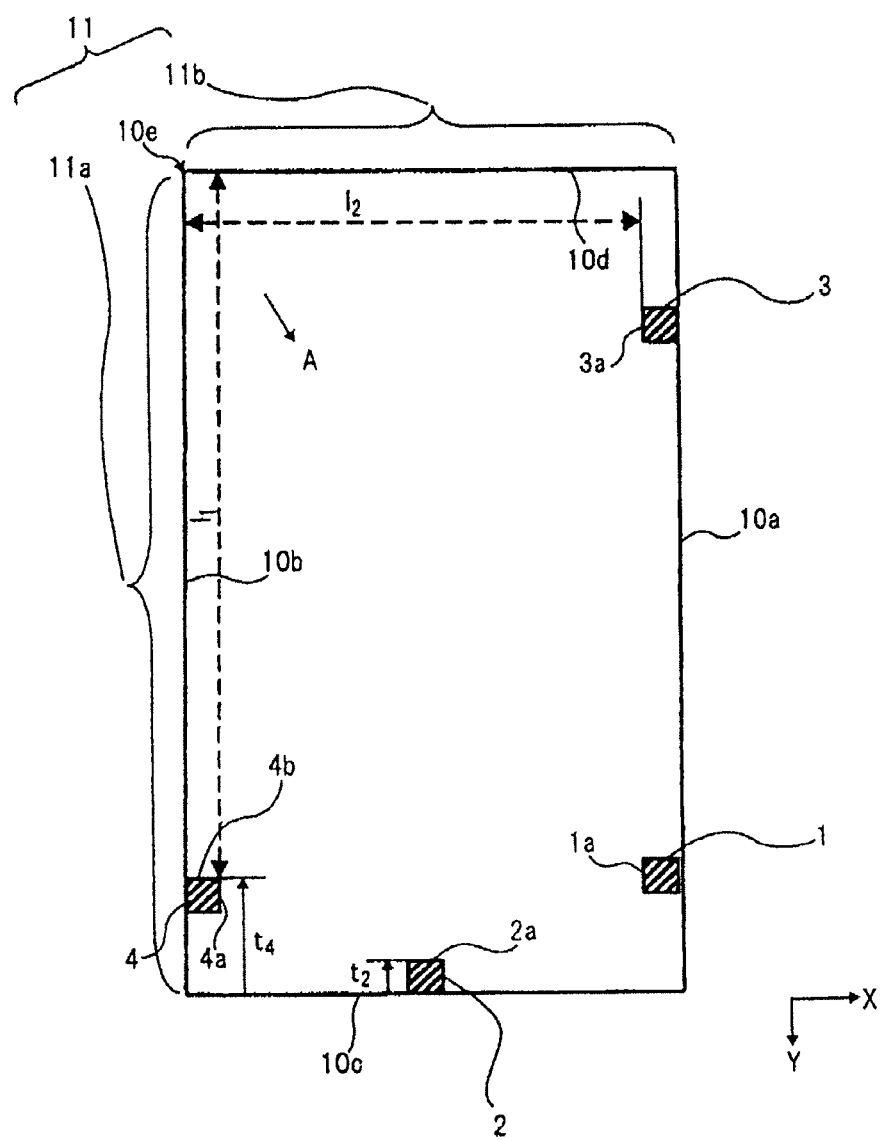
FIG. 1 is a plan view illustrating a bag-like separator in accordance with a first embodiment of the invention.
Figure 2A:
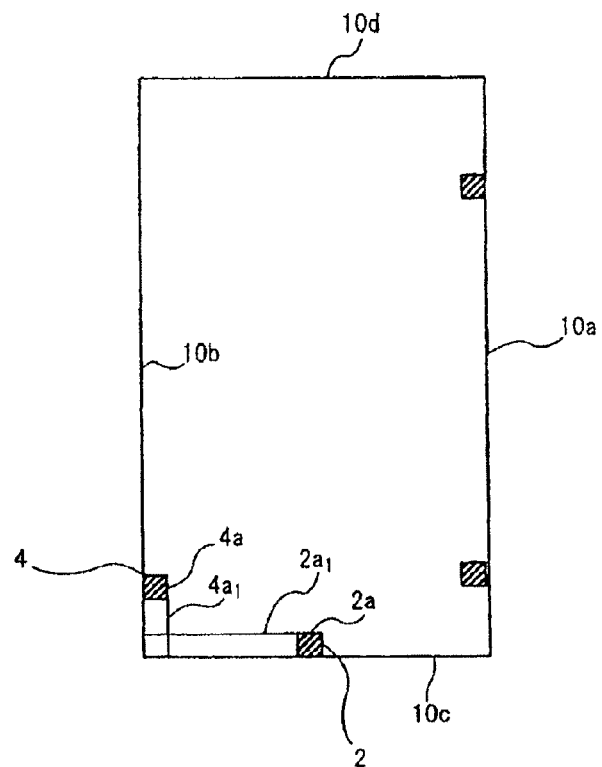
FIG. 2A illustrates a positional relationship of a thermo-bonding section.
Figure 2B:
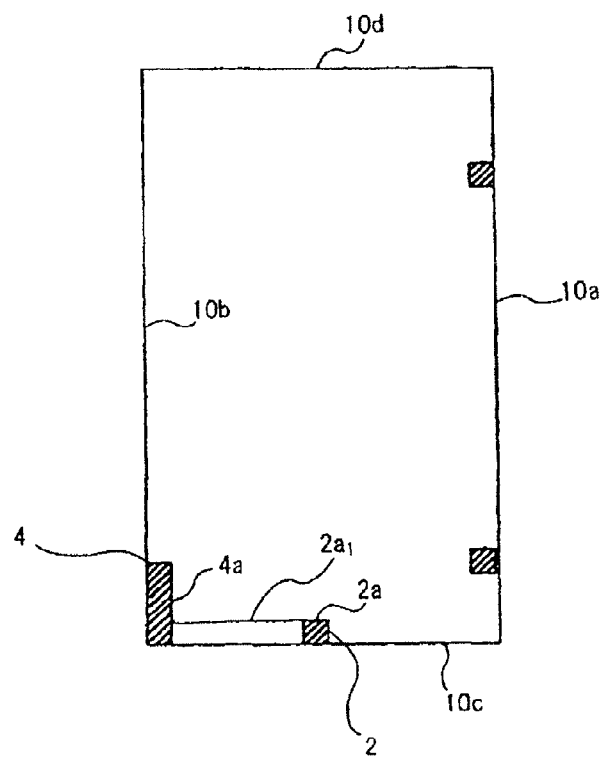
FIG. 2B illustrates a positional relationship of the thereto-bonding section.
Figure 3:
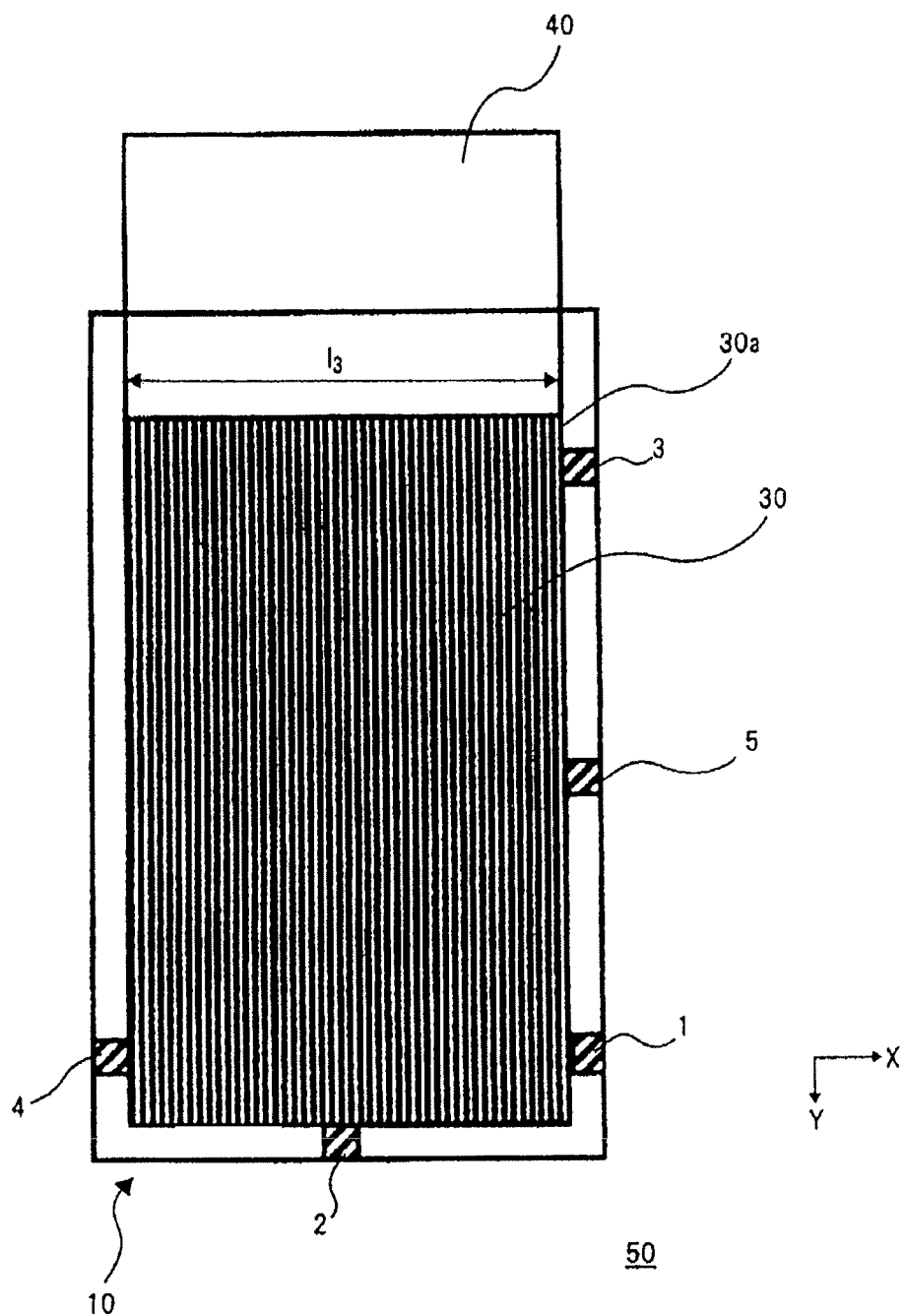
FIG. 3 is a plan view illustrating an electrode separator assembly in accordance with the first embodiment of the invention.

FIG. 1 is a plan view illustrating a bag-like separator in accordance with this embodiment, FIGS. 2A and 2B illustrate positional relationships of a thermo-bonding section, and FIG. 3 is a plan view illustrating an electrode separator assembly in accordance with this embodiment.

Bag-like separator 10 is produced in the form of a bag by bonding two sheets of microporous films. Bag-like separator 10 has a rectangular shape with four separator sides. Bag-like separator 10 is made of a polyolefin resin film of polyethylene, polypropylene, etc. or a polyester resin film with a thickness in the range from 1 μm to 100 μm, and preferably, from 10 μm to 50 μm, by forming pores in the film. The film may be elongated or not, but is preferably elongated due to higher tensile strength. In the case of using a uniaxially-elongated microporous separator, when elongation is directed from insertion opening sides including a thermo-bonding section towards opposite sides (in the direction from insertion opening sides 10b to separator thermo-bonding sides 10a), an electrode can be held in a direction with higher tensile strength since it is sandwiched between thermo-bonding section 4 and thermo-bonding section 1.

Thermo-bonding sections 1, 3 and 2 are formed in two adjacent separator thermo-bonding sides 10a and 10c of the four separator sides. Separator thermo-bonding side 10a is thermo-bonded at two thermo-bonding sections 1 and 3, and separator thermo-bonding side 10c is thermo-bonded at thermo-bonding section 2 in the central portion. Insertion opening sides 10b and 10d, namely the remaining two adjacent separator sides, form insert openings through which electrode 30 can be inserted. Thermo-bonding section 4 is formed in a portion of insertion opening side 10b.

In the meantime, bag-like separator 10 may be formed by folding one sheet of microporous film at one of separator thermo-bonding side 10a or separator thermo-bonding side 10c.

Insertion opening 11 through which electrode 30 is inserted into bag-like separator 10 includes first insertion opening 11a with width $I_1$ and section insertion opening 11b with width $I_2$. First insertion opening 11a is formed adjacent to insertion opening side 10b. Second insertion opening 11b is formed in insertion opening side 10d, which is adjacent to insertion opening side 10b. First and second insertion openings 11a and 11b are connected to each other, thereby forming one wide insertion opening 11. Thus, bag-like separator 10 is configured such that battery 30 can be inserted into bag-like separator 10 in an inclined direction indicated with arrow A in the figure.

Respective thermo-bonding sections 1, 2, 3 and 4 are used to bond two sheets of microporous films. Thermo-bonding sections 1, 2, 3 and 4 also act to position the electrode inside bag-like separator 10 and prevent the electrode from being misaligned.

Thermo-bonding sections 1 and 3 are disposed in portions near by both ends of separator thermo-bonding side 10a. In addition, thermo-bonding sections 1 and 3 are disposed with an interval shorter than longer side 30a of electrode 30, which will be described later. In this embodiment, thermo-bonding section 1 is disposed in a portion near by separator thermo-bonding side 10c, and thermo-bonding section 3 is disposed in a portion adjacent to insertion opening side 10d.

Thermo-bonding sections 1 and 3 are formed in the same shape. An opposing side 1a of thermo-bonding section 1 opposite insertion opening side 10b and an opposing side 3a of thermo-bonding section 3 insertion opening side 10b are spaced at the same distance from separator thermo-bonding side 10a. Insertion opening side 10b is a side opposite separator thermo-bonding side 10a in which thermo-bonding sections 1 and 3 are formed.

Specifically, thermo-bonding sections 1 and 3 have a function of positioning an electrode in the X direction by bringing longer side 30a of electrode 30 into contact with opposing sides 1a and 3a. Thermo-bonding sections 1 and 3 also serve as guides when inserting electrode 30 into bag-like separator 10. In the meantime, a thermo-bonding section (e.g., thermo-bonding section 5 shown in FIG. 3) can be provided with the same configuration between thermo-bonding section 1 and thermo-bonding section 3.

While this embodiment is illustrated with respect to two thermo-bonding sections 2 formed in separator thermo-bonding side 10c, this is not intended to limit the invention. Rather, a plurality of thermo-bonding sections can be formed.

In a portion of insertion opening side 10b, one thermo-bonding section 4 is disposed to be near by separator thermo-bonding side 10c. Thermo-bonding section 4 is disposed such that the distance between opposing side 4a of thermo-bonding section 4 and opposing side 1a of thermo-bonding section 1 is slightly wider than width $I_3$ of electrode 30 to be inserted into bag-like separator 10. This is for positioning electrode 30 in the X direction while ensuring an insertion margin of electrode 30 to be inserted into bag-like separator 10. Opposing side 4a is oriented toward separator thermo-bonding side 10a. Separator thermo-bonding side 10a is a side opposite insertion opening side 10b including thermo-bonding section 4.

Subsequently, the positional relationship of thermo-bonding section 4 and thermo-bonding section 2 will be described with reference to FIGS. 1, 2A and 2B.

In the respective figures, thermo-bonding section 4 is disposed to be above thermo-bonding section 2, but the entire part of bonding section 4 is not disposed under thermo-bonding section 2. In other words, distance $t_4$ from separator thermo-bonding side 10c to side 4b of thermo-bonding section 4 is set to be greater than distance $t_2$ from separator thermo-bonding side 10c to opposing side 2a of thermo-bonding section 2. In the meantime, side 4b means one of the peripheral sides of thereto-bonding section 4, which is near by corner 10e defined by insertion opening sides 10b and 10d.

As such, thermo-bonding section 4 is formed in a position extending beyond the width (corresponding to distance $t_2$) of thermo-bonding section 2 with a protruding amount $t_4-t_2>0$ rather than in a position within the width of thermo-bonding section 2. The result of this configuration is to prevent inserted electrode 30 from being misaligned in the X direction. In addition, width $I_1$ of insertion opening 11a can be ensured as wide as possible by setting protruding amount $t_4-t_2$ to be as small as possible. This as a result facilitates inserting electrode 30 in the direction of arrow A.

Thermo-bonding section 4 may have a configuration that is distanced from separator thereto-bonding side 10c as shown in FIG. 1 or FIG. 2A, or that extends to separator thermo-bonding side 10c as shown in FIG. 2B.

Describing the positional relationship of thermo-bonding section 4 and thermo-bonding section 2 with reference to FIGS. 2A and 2B, thermo-bonding section 4 in insertion opening side 10b is formed in a position where opposing side 4a which is one of the peripheral sides of thermo-bonding section 4, opposing side 4a being oriented toward separator thereto-bonding side 10a opposite insertion opening side 10b, or an extension line 4a1 extending from opposing side 4a toward separator thermo-bonding side 10c adjacent to insertion opening side 10b intersects extension line 2a1 extending from opposing side 2a of peripheral sides of thermo-bonding section 2 formed in separator thermo-bonding side 10c adjacent to insertion opening side 10b, opposing side 2a being oriented toward insertion opening side 10d opposite separator thermo-bonding side 10c.

An extension 40 is attached to one side of electrode 30 to be inserted into bag-like separator 10. Extension 40 is for forming a current-collecting part, which will be described later.

Next, a description will be given of a method of producing an electrode separator assembly in accordance with this embodiment with reference to FIGS. 4A, 4B, 4C, 5A, 5B and 5C.

Figure 4A:
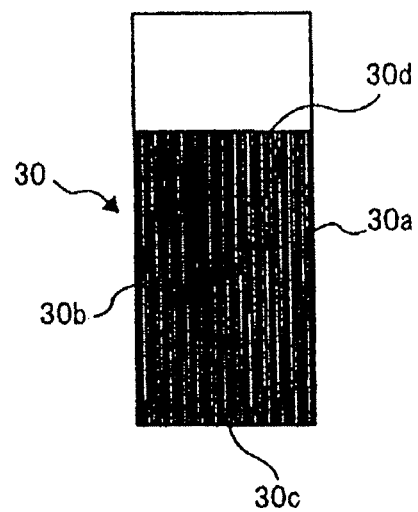
FIG. 4A is a plan view of an electrode in accordance with the first embodiment of the invention.
Figure 4B:
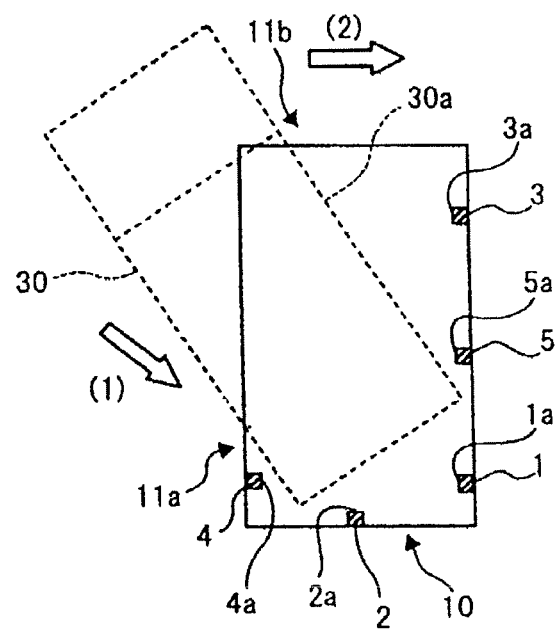
FIG. 4B illustrates a process of inserting the electrode in an inclined posture through an insertion opening into the bag-like separator in accordance with the first embodiment of the invention.
Figure 4C:
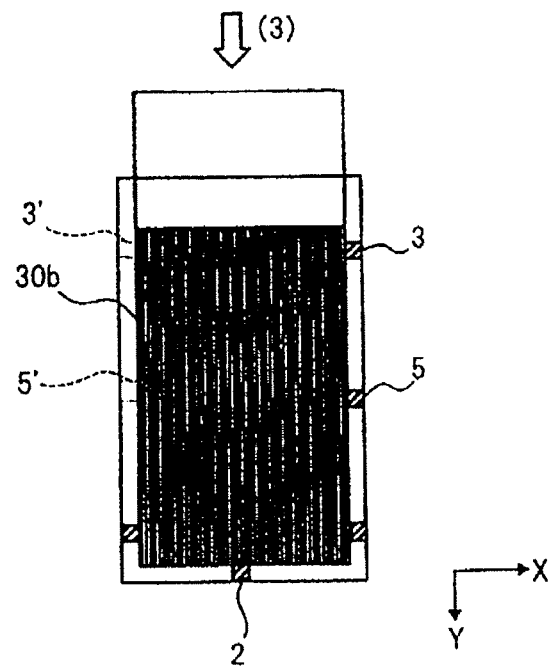
FIG. 4C illustrates the electrode located inside the bag-like separator in accordance with the first embodiment of the invention.

FIGS. 4A, 4B and 4C illustrate a process of inserting electrode 30 into bag-like separator 10 through insertion opening 11 by inclining electrode 30. Hereinafter, bag-like separator 10 will be illustrated with respect to thermo-bonding section 5 formed between thermo-bonding sections 1 and 3.

FIG. 4A is a plan view of electrode 30.

Firstly, electrode 30 is inclined and inserted into bag-like separator 10 through both first and second insertion openings 11a and 11b in a direction indicated by arrow (1) in FIG. 4B, starting from shorter side 30c. In FIG. 4B, electrode 30 in this state is illustrated with a dotted line. Thermo-bonding section 4 is formed in a position that can ensure width $I_1$ of insertion opening 11a as wide as possible. As a result, electrode 30 is not obstructed by thermo-bonding section 4 when inserted into bag-like separator 10, and the inclination of electrode 30 to be inserted into bag-like separator 10 can be adjusted with high degree of freedom.

Then, inclined electrode 30 with shorter side 30c partially inserted is rotated (see an arrow (2)) so that longer side 30a of electrode 30 comes into contact with opposing sides 3a and 5a of thermo-bonding sections 3 and 5. Since second insertion opening 11b is formed in bag-like separator 10 of this embodiment, this rotation can be performed with the electrode inserted into bag-like separator 10 even though extension 40 is previously provided in electrode 30.

Subsequently, opposing sides 3a and 5a of thermo-bonding sections 3 and 5 are slid in the direction of an arrow (3) in FIG. 4C. At this point, thermo-bonding section 4 does not act as a guide. When electrode 30 is further slid in the direction of arrow (3) in FIG. 4C, thermo-bonding section 1 and thermo-bonding section 4 guide electrode 30 on both sides. Longer side 30b, which has not been guided until now, is guided by thermo-bonding section 4. Electrode 30 guided by thermo-bonding sections 1 and 4 slides in the direction of arrow (3) until butting against side 2a of thermo-bonding section 2.

Electrode 30 butting against thermo-bonding section 2 is positioned in the Y direction by thermo-bonding section 2 and in the X direction by thermo-bonding sections 1, 3, 4 and 5.

In FIGS. 4A, 4B and 4C, electrode 30 is inclined and inserted into bag-like separator 10, is rotated, and then is inserted until butting against thermo-bonding section 2. However, FIGS. 5A, 5B and 5C illustrate a process of inserting electrode 30 into bag-like separator 10 without rotating it.

Figure 5A:
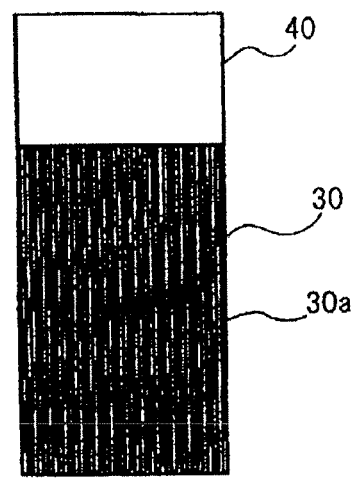
FIG. 5A is a plan view illustrating the electrode in accordance with the first embodiment of the invention.

FIG. 5A is a plan view of electrode 30.

Figure 5B:
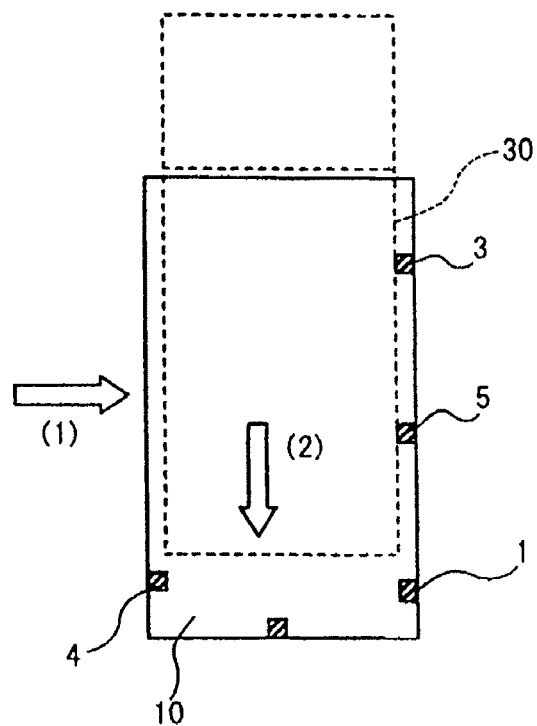
FIG. 5B illustrates a process of inserting the electrode in a straight posture through an insertion opening into the bag-like separator in accordance with the first embodiment of the invention.
Figure 5C:
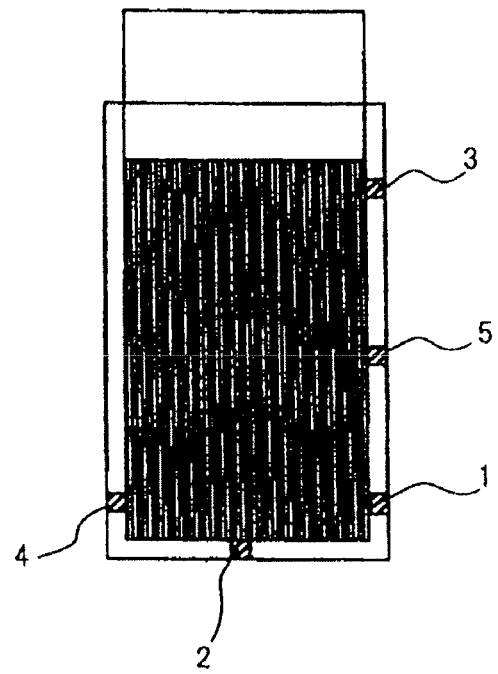
FIG. 5C illustrates the electrode located inside the bag-like separator in accordance with the first embodiment of the invention.

Firstly, electrode 30 is inserted through first insertion opening 11a, starting from longer side 30a, straightly in a direction indicated by an arrow (1) in FIG. 5B. Since second insertion opening 11b is formed in bag-like separator 10 of this embodiment, electrode 30 with extension 40 can be inserted without a problem.

Electrode 30 is inserted until longer side 30a butts against thereto-bonding sections 3 and 5, is slid in the direction of arrow (2) by using thermo-bonding sections 3 and 5 as guides. Positioning is accomplished by bringing electrode 30 to finally butt against thermo-bonding section 2 (FIG. 5C).

As such, in this embodiment, insertion opening 11 of bag-like separator 10 is wide since it includes first and second insertion opening 11a and 11b spanning two adjacent sides. In addition, thermo-bonding section 4 is disposed in a portion rather than in the entire portions of insertion opening side 10b such that width $I_I$ of first 1 insertion opening 11a is as wide as possible. As a result, bag-like separator 10 of this embodiment has a high degree of freedom in the direction and posture of inserting electrode 30 into bag-like separator 10. Thereby, the operation of inserting electrode 30 is very easy.

In addition, in this embodiment, electrode 30 proceeds inside bag-like separator 10 with only one side being guided by thereto-bonding sections 3 and 5 just before butting against thermo-bonding section 2. Then, electrode 30 is guided by thermo-bonding sections 1 and 4 from a position just before it buts against thermo-bonding section 2. Since thermo-bonding section 4 is disposed in a portion rather than in the entire portions of insertion opening side 10b, electrode 30 can maintain an inclined posture inside bag-like separator 10 just before positioning of electrode 30 is accomplished. In addition, since any thermo-bonding sections are absent on both sides of electrode 30 just before electrode 30 butts against thermo-bonding section 2, there is no slide resistance between thermo-bonding section 4 and electrode 30. As a result, electrode 30 can very easily move inside bag-like separator 10.

In addition, in this embodiment, electrode 30 inserted into bag-like separator 10 is located in the X and the Y directions by thermo-bonding sections 1 to 5. This, as a result, can prevent electrode 30 from being misaligned inside bag-like separator 10 in the following process or after a battery is produced. As an alternative for enhancing the positioning operation, as shown in FIG. 4C, thermo-bonding sections 3' and 5' may be provided in positions opposite thermo-bonding sections 3 and 5 after electrode 30 is positioned inside bag-like separator 10. Thermo-bonding sections 3' and 5' are formed in positions dividing insertion opening 11. However, thermo-bonding sections 3' and 5' are formed after electrode 30 is already inserted into bag-like separator 10 and is positioned inside bag-like separator 10. Thus, thermo-bonding sections 3' and 5' do not make it difficult to insert or to move electrode 30 into or inside bag-like separator 10.

In the meantime, the length of width $I_1$ is preferably from 50% to 99% of the entire length of the side, more preferably from 70% to 99%, and still more preferably from 90% to 99%. If the ratio of width $I_1$ is too small, it is difficult to store the electrode because of increased movement of the electrode in a high-slide resistance state until the electrode is pushed to a finally-stored position. If the ratio of width $I_1$ is too large, it is impossible to obtain the effect of preventing misalignment in a width direction since the amount of catching the electrode is excessively small.

Second Embodiment

Figure 6A:
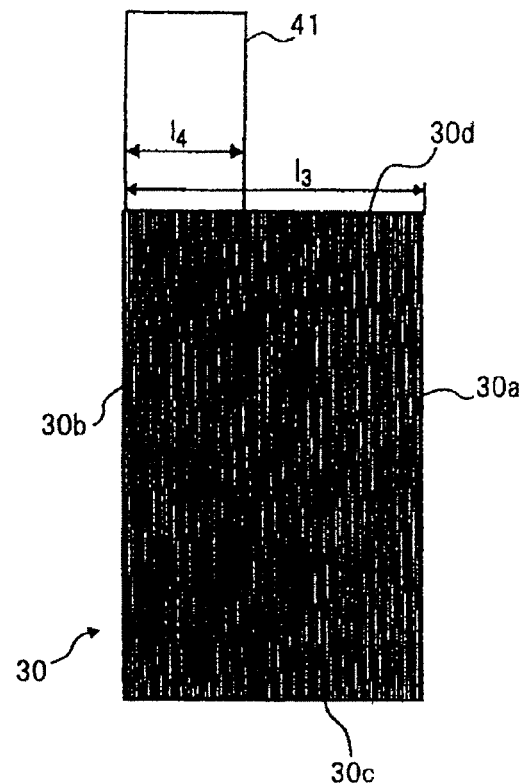
FIG. 6A is a plan view illustrating an electrode in accordance with a second embodiment of the invention.
Figure 6B:
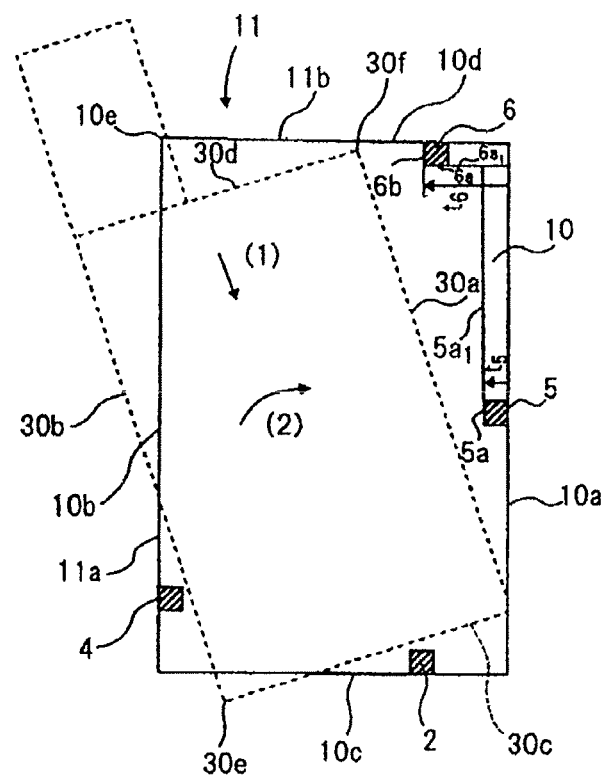
FIG. 6B illustrates a process of inserting the electrode into a bag-like separator in accordance with the second embodiment of the invention.
Figure 6C:
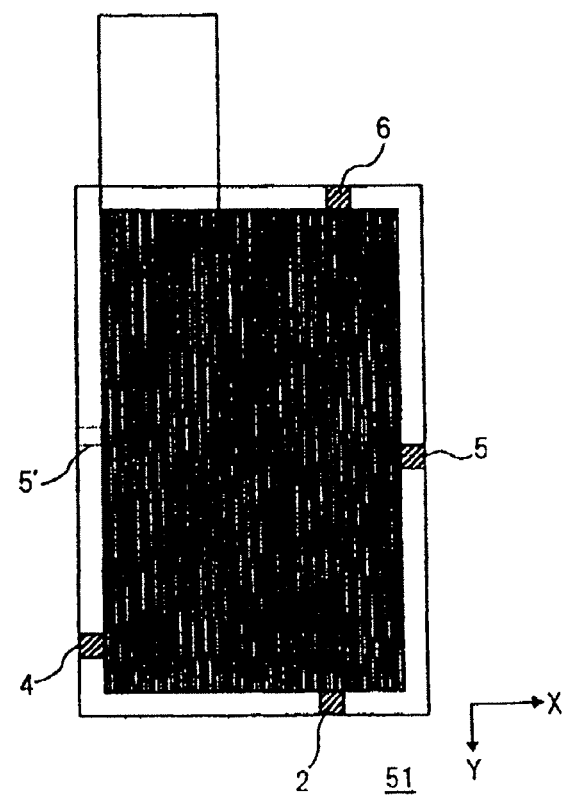
FIG. 6C illustrates the electrode located inside the bag-like separator in accordance with the second embodiment of the invention.

FIGS. 6A, 6B and 6C illustrate a process of inclining and inserting electrode 30 into bag-like separator 10 through insertion opening 11. In the description of this embodiment, the same reference numerals and signs are used throughout to designate the same or similar components of the first embodiment.

In the first embodiment, extension 40 attached to shorter side 30d of electrode 30 has a width corresponding to width $I_3$ of shorter side 30d. In this embodiment, however, as shown in FIG. 6A, extension 41 has width $I_4$ smaller than width $I_3$ of shorter side 30d and is biased toward longer side 30b. Extension 41 can be formed by trimming an electrode into a shape including the extension, that is, a crank shape. In addition, the electrode may be prepared by first trimming a piece of electrode material in a rectangular shape so that a small amount of the uncoated portion of the electrode is material is exposed, and then by welding a rectangular metal film including a smaller width than the electrode material to the exposed portion. This, as a result, facilitates manufacturing since the electrode member can be prepared by used only a linear cutting process without cutting the electrode material into the shape of a crank.

As shown in FIG. 6B, bag-like separator 10 of this embodiment is different from the first embodiment in that thermo-bonding section 2 of thermo-bonding sections is biased toward separator thermo-bonding side 10a. Bag-like separator 10 of this embodiment is different from the first embodiment in that thermo-bonding section 6 is formed in insertion opening side 10d, biased toward separator thermo-bonding side 10a.

However, like the first embodiment, bag-like separator 10 of this embodiment has first and second insertion openings 11a and 11b in formed insertion opening sides 10b and 10d, respectively.

The positional relationship of thermo-bonding section 4 is the same as described in the first embodiment. The positional relationship of thermo-bonding section 6 formed in a portion of insertion opening side 10d is the same as that of thermo-bonding section 4. Specifically, distance $t_6$ from separator thermo-bonding side 10a to each side 6b of thermo-bonding section 6 is set to be greater than distance $t_2$ from separator thermo-bonding side 10a to opposing side 5a of thermo-bonding section 5. As such, thermo-bonding section 6 is formed in a position extending beyond the width (corresponding to distance $t_5$) of thermo-bonding section 5 with a protruding amount $t_6-t_5>0$ rather than in a position within the width of thermo-bonding section 5. The result of this configuration is to prevent inserted electrode 30 from being misaligned in the Y direction. In addition, width $I_2$ of insertion opening 11a can be ensured as wide as possible by setting protruding amount $t_6-t_5$ to be as small as possible. This, as a result, facilitates inserting the electrode.

Describing the positional relationship of thermo-bonding section 6 and thermo-bonding section 5, thermo-bonding section 6 formed in insertion opening side 10d is formed in a position where opposing side 6a of peripheral sides of thermo-bonding section 6, opposing side 6a being oriented toward separator thermo-bonding side 10c opposite insertion opening side 10d, or extension line 6a1 extending from opposing side 6a toward separator thermo-bonding side 10a adjacent to insertion opening side 10d intersects an extension line 5a1 extending from opposing side 5a of peripheral sides of thermo-bonding section 5 formed in separator thermo-bonding side 10a adjacent to insertion opening side 10d, opposing side 5a being oriented toward insertion opening side 10b opposite separator thermo-bonding side 10a.

Next, a description will be given of a method of producing electrode separator assembly 51 in accordance with this embodiment with reference to FIGS. 6A, 6B and 6C.

FIG. 6A is a plan view of electrode 30 including extension 41.

Firstly, as shown in FIG. 6B, electrode 30 in an inclined position is inserted from first and second insertion openings 11a and 11b into bag-like separator 10 until to shorter side 30c of electrode 30 butts against thermo-bonding section 2 (in a direction of an arrow (1)). In this case, corner 30e between longer and shorter sides 30b and 30c of electrode 30 protrudes from separator thermo-bonding side 10c through a portion between thermo-bonding sections 2 and 4.

Then, electrode 30 is rotated in a direction of an arrow (2) in a position where shorter side 30c of electrode 30 is butted against thermo-bonding section 2. Since electrode 30 is inserted until corner 30e protrudes from separator thermo-bonding side 10c and then is rotated, there is no problem that corner 30f diagonally opposite corner 30e may butt against thermo-bonding section 6 to prevent electrode 30 from rotating in the direction of arrow (2).

The operation of inserting and locating electrode 30 into and inside bag-like separator 10 is accomplished by rotating electrode 30 until longer side 30a of electrode 30 butts against thermo-bonding section 5. In this embodiment, positioning an electrode in the X direction is carried out by thermo-bonding sections 4 and 5, and positioning an electrode in the Y direction is carried out by thermo-bonding sections 2 and 6. In addition, since width $I_4$ of extension 41 is smaller than width $I_3$ of shorter side 30*d*, extension 41 does not interfere with thermo-bonding section 6 even after insertion and positioning are finished.

In this embodiment, like the first embodiment, insertion opening 11 of bag-like separator 10 includes first and second insertion openings 11*a* and 11*b* spanning two adjacent sides. In addition, thermo-bonding section 4 is disposed such that width $I_1$ of first insertion opening 11*a* is as large as possible. With this configuration, electrode 30 can be very easily inserted into bag-like separator 10.

In addition, in this embodiment, until electrode 30 is positioned by thermo-bonding sections 2, 4, 5 and 6, electrode 30 is freely movable inside bag-like separator 10 without being exposed to interference from by respective thermo-bonding sections. Thus, it is very easy to position electrode 30.

Furthermore, in this embodiment, electrode 30 inserted into bag-like separator 10 is positioned in the X and Y directions by thermo-bonding sections 2 to 6. This, as a result, can prevent electrode 30 from being misaligned inside bag-like separator 10 in the following process or after a battery is produced. As an alternative for enhancing the positioning operation, as shown in FIG. 6C, thermo-bonding section 5' may be provided in a position opposite thermo-bonding section 5 after electrode 30 is located inside bag-like separator 10.

In the meantime, in this embodiment, electrode 30 with extension 41 can be inserted into bag-like separator 10 including thermo-bonding sections 1 to 4 shown in FIG. 1 as illustrated in the first embodiment. In this case, after electrode 30 is inserted, thermo-bonding section 5' and/or thermo-bonding section 6 shown in FIG. 6C may be formed.

Film-Covered Battery

Figure 7:
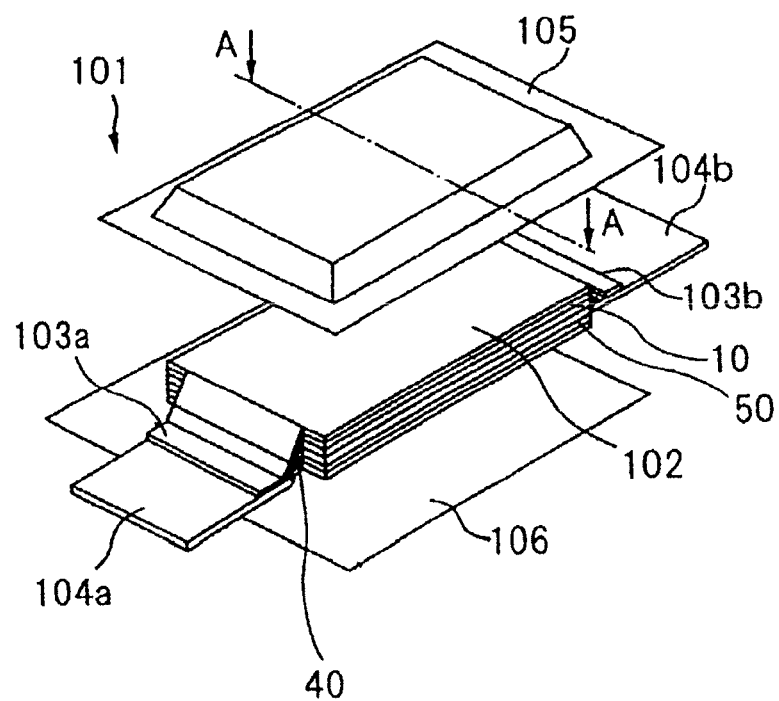
FIG. 7 is an exploded perspective view illustrating a configuration of a film-covered battery including an electrode separator assembly of the invention.

Subsequently, an exemplary construction of a film-covered battery including an electrode separator assembly of the invention is illustrated in FIG. 7.

Film-covered battery 101 includes power-generating element 102, positive and negative current-collecting parts 103*a* and 103*b* provided in power-generating element 102, an enclosure including two sheets of lamination films 105 and 106 that store therein power-generating element 102 and electrolyte, positive electrode tab 104*a* connected to positive current-collecting part 103*a*, and negative electrode tab 104*b* connected to negative current-collecting part 103*b*.

Electrode separator assembly 50 is provided by inserting positive electrode plates described as electrode 30 into bag-like separator 10. Power-generating element 102 is constructed by alternately stacking a plurality of electrode separator assemblies 50 and a plurality of negative electrode plates on each other, such that the positive electrode plates and the negative electrode plates are stacked via sandwiched separators. Alternatively, power-generating element 102 can be constructed by inserting a negative electrode plate into bag-like separator 10 without inserting a positive electrode plate into bag-like separator 10, and stacking a plurality of positive electrode plates and a plurality of bag-like separators on each other.

Each positive electrode plate has a positive electrode coated on an Al film and a negative electrode coated on a Cu film. Extensions 40 attached to the positive electrode plates are bonded with each other and extensions attached to the negative electrode plates are bonded with each other by ultrasonic welding, thereby forming positive electrode current-collecting part 103*a* and negative electrode current-collecting part 103*b* as connecting parts. At the same time, positive electrode tab 104*a* is connected to positive electrode current-collecting part 103*a* and negative electrode tab 104*b* is connected to negative electrode current-collecting part 103*b* by ultrasonic welding.

Positive electrode tab 104*a* and negative electrode tab 104*b* extending from the two shorter sides of the enclosure are made of an Al plate and a Cu plate.

The enclosure is constructed with two sheets of lamination films 105 and 106 that surround power-generating element 102 by sandwiching it from both sides in thickness direction. Respective lamination film 105 and 106 is formed by stacking a thermo-bonding inner resin layer, a metal layer and an outer resin layer. Power-generating element 102 is sealed by thermally bonding edges of lamination films 105 and 106 with a polypropylene (PP) layer formed as an inner layer of the battery.

Lamination films 105 and 106 can be made of any film that is used in such a film-covered battery as long as the film can seal power-generating element 102 such that electrolyte does not leak. A lamination film formed by stacking a thin metal layer and a thermo-bonding resin layer on each other is generally used. The lamination film may be formed for example by bonding a thermo-bonding resin with a thickness from 3 μm to 200 μm to a metal film with a thickness from 10 μm to 100 μm. The metal film or metal layer may be made of Al, Ti, Ti based alloys, Fe, stainless, Mg based alloys, etc. The thermo-bonding resin, namely the inside resin layer, may be made of polyesters such as polypropylene, polyethylene, acidic denatures thereof, polyphenylene sulfide, polyethylene terephthalate; polyamide, ethylene-vinyl acetate copolymer, etc. The outside resin layer may be suitably made of nylon, etc.

In the meantime, power-generating element 102 can be implemented with any power-generating elements that are used in a typical battery as long as they include a positive electrode, a negative electrode and electrolyte. In a typical lithium secondary battery, the power-generating element is produced by preparing a positive electrode plate by applying activator such as lithium-manganese oxide and lithium-cobalt oxide on both sides of an aluminum film, preparing a negative electrode plate by applying carbon material capable of lithium-doping/dedoping on both sides of a copper film or the like, and immersing the plates into electrolyte containing lithium salt.

Power-generating element 102 can be implemented with a power-generating element of different types of chemical batteries such as a nickel-hydrogen battery, a nickel-cadmium battery, a lithium-metal primary battery or secondary battery, and a lithium-polymer battery. In addition, the invention is also applicable to an electric device is such as a capacitor element in which an electric device element that may generate gas through a chemical or physical reaction by storing electric energy therein is sealed by a cover film. The capacitor element is exemplified by a capacitor, such as an electric double layer capacitor (EDLC), or an electrolytic condenser.

While the present invention has been illustrated with respect to the film-covered battery, it is also applicable to a battery that uses a metal plate in which rectangular embossments are formed or a box-like metal vessel as an enclosure.

The present application claims priority from Japanese Patent Application Number 2007-015236, filed Jan. 25, 2007, the disclosure of which is hereby incorporated by reference herein in its entirety.

The invention claimed is:

1. A rectangular bag-like separator produced in the form of a bag by thermo-bonding of peripheral portions of a resin film, wherein the rectangular bag-like separator defines four separator sides including two adjacent first and second bonding sides each including a bonding section therein and two adjacent first and second insertion opening sides defining an insertion opening through which an electrode is allowed to be inserted,
- wherein said first insertion opening side has a bonding section therein, said first insertion opening side is adjacent to said first bonding side,
- wherein the bonding section of said first insertion opening side defines a first side that opposes said second insertion opening side, and the bonding section of said first bonding side defines a second side that opposes said second insertion opening side,
- wherein said first side is located farther from said first bonding side than said second side, and
- wherein a distance from said first side to said second insertion opening side is within 50% to 99% of a whole length of said first insertion opening side.

2. An electrode separator assembly comprising:
- a rectangular bag-like separator in accordance with claim 1; and
- an electrode stored inside the bag-like separator.

3. The electrode separator assembly in accordance with claim 2, wherein the electrode is positioned by the bonding sections of said first and second bonding sides and the bonding section of said first insertion opening side.

4. The electrode separator assembly in accordance with claim 2, wherein the extension provided on the electrode is narrower than the width of the electrode, and is provided in a position that does not interfere with the bonding section of said first insertion opening side.

5. A method of producing an electrode separator assembly comprising:
- a first procedure of forming two adjacent first and second bonding sides by forming bonding sections in two adjacent sides of four separator sides of a rectangular bag-like separator;
- a second procedure of forming two adjacent first and second insertion opening sides defining an insertion opening through which an electrode is allowed to be inserted, by using the other two sides of said four separator sides, wherein said first insertion opening side has a bonding section therein, said first insertion opening side is adjacent to said first bonding side, wherein said bonding section of said first insertion opening side defines a first side that opposes said second insertion opening side, and the bonding section of said first bonding side defines a second side that opposes said second insertion opening side, wherein said first side is located farther from said first bonding side than said opposing side and a distance from said first side to said second insertion opening side is within 50% to 99% of a whole length of said first insertion opening side; and
- inserting the electrode through the insertion opening into a bag-like separator obtained from the first and second procedures.

6. The method in accordance with claim 5, comprising:
- moving the electrode inside the bag-like separator while guiding the electrode by only the bonding sections of said second bonding side; and
- moving the electrode inside the bag-like separator while guiding the electrode by the bonding sections of said second bonding side and the bonding section of said first insertion opening side.

7. The method in accordance with claim 5, comprising:
- positioning the electrode by the bonding sections of said second bonding side and the bonding section of said first insertion opening side.

8. The method in accordance with claim 5, comprising:
- previously preparing an extension in a position that does not interfere with the bonding section of said first insertion opening side, the extension including a width narrower than the width of the electrode, and inserting the electrode with the extension into the bag-like separator.

9. The method in accordance with claim 5, comprising:
- forming a bonding section in a position of said first and second insertion opening sides after the electrode is inserted into and positioned inside the bag-like separator.

10. The rectangular bag-like separator in accordance with claim 1, wherein said first bonding side and said second bonding side are respectively formed by folding a separator sheet.

11. The method in accordance with claim 5, wherein said first bonding side and said second bonding side are respectively formed by folding a separator sheet.

12. The rectangular bag-like separator in accordance with claim 1, wherein said second insertion opening side is a side which has the bonding section.

13. The method in accordance with claim 5, wherein said second insertion opening side is a side which has the bonding section.

14. The rectangular bag-like separator in accordance with claim 1, wherein said second insertion opening side is a side which does not have the bonding section.

15. The method in accordance with claim 5, wherein said second insertion opening side is a side which does not have the bonding section.

* * * * *

UNITED STATES PATENT AND TRADEMARK OFFICE
CERTIFICATE OF CORRECTION

PATENT NO.        : 8,497,032 B2
APPLICATION NO. : 12/524275
DATED             : July 30, 2013
INVENTOR(S)       : Kiyokazu Oikawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 700 days.

Signed and Sealed this

Fifteenth Day of September, 2015

Michelle K. Lee
*Director of the United States Patent and Trademark Office*